May 16, 1933.  E. R. GURNEY  1,908,750
FRONT AXLE AND DUST COVER CONSTRUCTION
Filed March 14, 1930
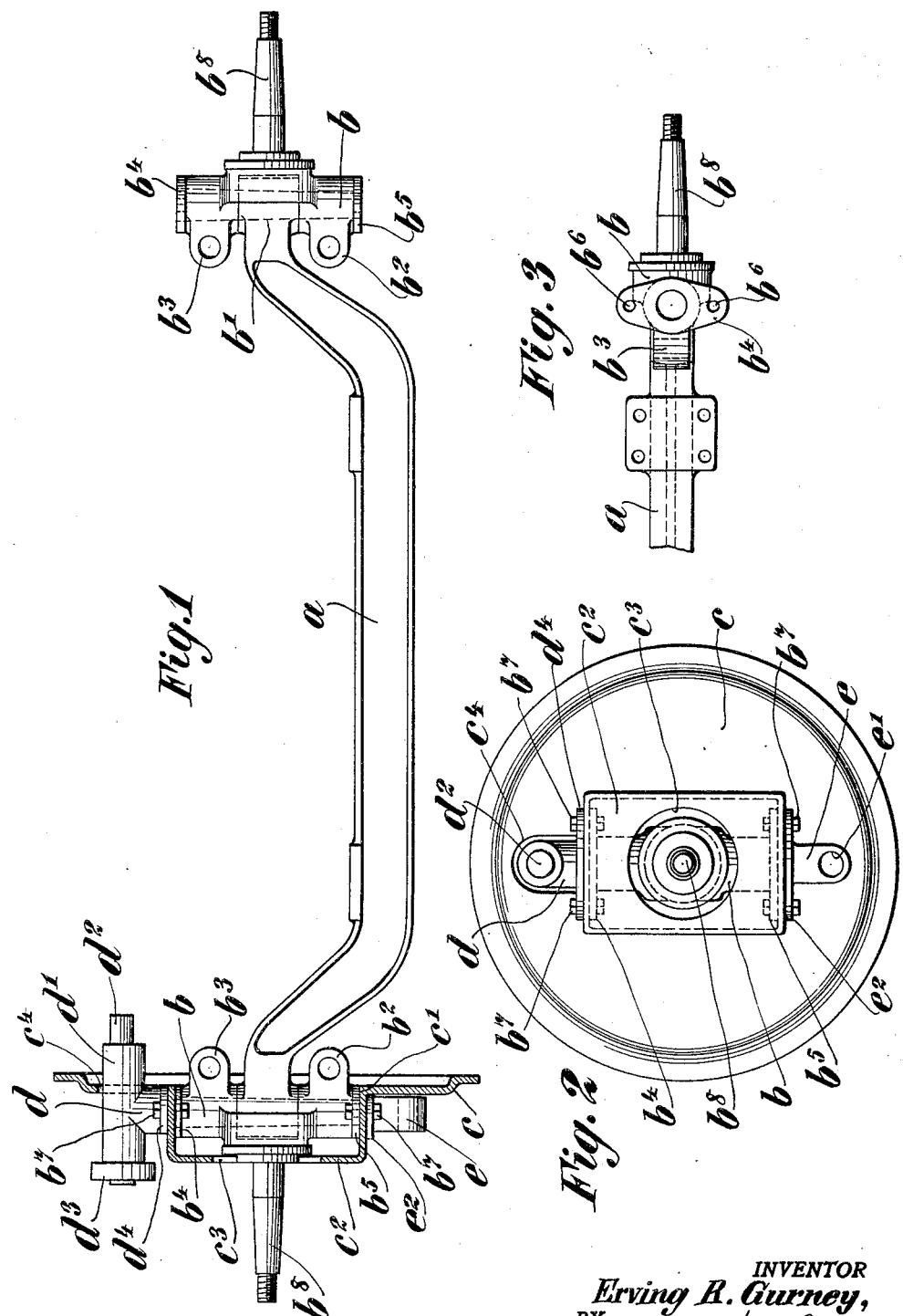
INVENTOR
Erving R. Gurney,
BY Redding, Greeley, O'Shea + Campbell
HIS ATTORNEYS Patented May 16, 1933

1,908,750

UNITED STATES PATENT OFFICE

ERVING R. GURNEY, OF ALLENTOWN, PENNSYLVANIA, ASSIGNOR TO INTERNATIONAL MOTOR COMPANY, OF NEW YORK, N. Y., A CORPORATION OF DELAWARE

FRONT AXLE AND DUST COVER CONSTRUCTION

Application filed March 14, 1930. Serial No. 435,769.

The present invention relates to axle constructions for motor vehicles and embodies, more specifically, an improved front axle and dust cover construction by means of which the parts are greatly simplified in design and reduced in number, whereby manufacture and assembly is materially improved.

In present motor vehicle design, it is customary to provide brakes upon the front axles in addition to the rear axles. With the steering mechanism necessary to steer the vehicle properly, there results a rather complicated arrangement of parts which not only is difficult to assemble but is likewise inconvenient to inspect and repair from time to time. In order that the construction and number of parts necessary to assemble may be simplified and reduced, it is proposed, by the present invention, to provide a single mounting by means of which the brake mechanism may be readily assembled upon the steering knuckles of the front axle of a motor vehicle without disturbing the related parts of the axle and vehicle frame, thus greatly facilitating the assembly and maintenance of the parts.

An object of the invention, accordingly is to provide a front axle for a motor vehicle by means of which the brake mechanism may be readily assembled thereon.

A further object of the invention is to provide a construction of the above character by means of which the design and number of parts is materially reduced and simplified.

A further object of the invention is to provide an improved construction, wherein the dust cover and associated braking elements are readily mounted in position upon the steering knuckle of a motor vehicle.

Further objects, not specifically enumerated above, will be apparent as the invention is described in greater detail in connection with the accompanying drawing, wherein:

Figure 1 is a view in front elevation, partly in section, taken through a dust cover constructed in accordance with the present invention and showing the manner in which the parts are assembled.

Figure 2 is a view in end elevation, showing the dust cover and associated parts of Figure 1.

Figure 3 is a plan view of one end of an axle constructed in accordance with the present invention and having a steering knuckle adapted to receive the brake rigging as described hereinafter.

With reference to the above drawing, $a$ designates the front axle of a motor vehicle which may be constructed in any approved fashion. At either end of this axle steering knuckles $b$ are secured by means of king pins $b'$. An apertured flange $b^2$ is provided upon each knuckle preferably below the axle for securing the steering mechanism thereto, thus effecting the desired steering of the vehicle by proper turning of the knuckles. Symmetrically with the flange $b^2$ is a flange $b^3$ upon each knuckle, this flange being adapted to receive the brake operating mechanism, such as a cable or other device which operates the brake mechanism in any approved fashion.

Oppositely extending horizontal flanges $b^4$ are provided at the top of each knuckle, while similar flanges $b^5$ are formed at the bottoms thereof. These flanges are formed with apertures $b^6$ through which bolts $b^7$ extend to secure the mechanism described hereinafter in position.

The dust covers for the forward brakes are shown at $c$ and are preferably formed as shown in Figures 1 and 2. About the axis of these covers a rectangular aperture $c'$ is formed, this aperture receiving a box-shaped recess $c^2$ which may either be formed integral with the cover, welded thereto, or secured in any other approved fashion. An aperture $c^3$ is formed axially of the box to receive the wheel spindle $b^8$ of the knuckle $b$. The wheel spindle is provided with a seal which cooperates with the aperture $c^3$ to effectively prevent the passage of dust through the aperture. Apertures are likewise formed in the top and bottom walls to receive bolts $b^7$. Extending upwardly from the apertures $c'$ is an aperture $c^4$ which receives a T-shaped fitting $d$ having a transverse bearing portion $d'$ for journalling a brake cam shaft $d^2$. This shaft may be formed with a cam $d^3$ for operating brake mechanism constructed in any well known fashion. Flanges $d^4$ are formed upon the fitting $d$ and are provided with apertures to receive the bolts $b^7$. It will thus be seen that the dust cover and fitting $d$ are secured in position by means of bolts $b^7$ at the top of the box-shaped portion $c^2$ of the dust cover and may thus be readily assembled and dismounted.

On the underside of the box-shaped portion $c^2$ of the dust cover, a fitting $e$ is secured, this fitting having a bearing $e'$ for receiving the brake shoe mounting mechanism and oppositely extending flanges $e^2$ formed with apertures to receive the lower bolts $b^7$. In a manner similar to that described in connection with the fitting $d$ and upper portion of the box $c^2$, the lower portion thereof is secured in position simultaneously with the mounting of fitting $e$ by means of the lower bolts $b^7$.

From the foregoing, it will be seen that the dust cover construction has been greatly simplified and the mounting thereof materially facilitated. The number and character of parts has been greatly reduced and simplified, and the dust cover by means of the provision of the box-shaped recess described above, serves more effectively as a closure for the brake mechanism.

While the invention has been described with specific reference to the accompanying drawing, it is not to be limited, save as defined in the appended claims.

I claim as my invention:

1. A steering knuckle having oppositely extending horizontal flanges at the top and bottom thereof, a dust cover provided with a rectangular recess, apertures, being formed in the flanges and in the top and bottom walls of the recess, brackets at the top and bottom of the knuckle, apertured flanges on the brackets overlying the flanges on the knuckle, and bolts passing through the respective apertures and securing the cover between the flanges.

2. A steering knuckle having oppositely extending horizontal flanges at the top and bottom thereof, a dust cover provided with a rectangular recess, apertures being formed in the flanges and in the top and bottom walls of the recess, brackets at the top and bottom of the knuckle, and means to mount the brackets and dust cover upon the flanges.

3. A steering knuckle having mounting surfaces at the top and bottom thereof, a dust cover provided with a recess formed with side, top and bottom walls, and an apertured back wall through which a wheel spindle is adapted to pass, and means to secure the top and bottom walls to the mounting surfaces.

4. A steering knuckle having flanges forming mounting surfaces at the top and bottom thereof, a dust cover provided with a recess, brackets at the top and bottom of the knuckle having flanges adapted to overlie the first flanges, and means to secure the respective flanges of the brackets and knuckle to opposite walls of the recess.

This specification signed this 4th day of March, A. D. 1930.

ERVING R. GURNEY.